United States Patent Office 3,177,202
Patented Apr. 6, 1965

3,177,202
6-AMINO-5H-DIBENZO[d,f][1,3]DIAZEPINES
William E. Kreighbaum and Homer C. Scarborough, Evansville, Ind., assignors to Mead Johnson & Company, Evansville, Ind., a corporation of Indiana
No Drawing. Filed Oct. 14, 1963, Ser. No. 316,140
11 Claims. (Cl. 260—239)

The present invention is concerned with a group of 6-amino-5H-dibenzo[d,f][1,3]diazepines having the following formula, the acid addition salts of these substances, and with processes for their preparation. As an aid in dealing with nomenclature questions, the positions of the ring structure are numbered according to the system used by Chemical Abstracts.

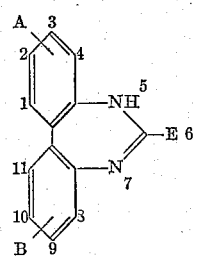

Formula I

In Formula I the symbols A and B refer to one or two substituents attached respectively at the 1, 2, 3, 4, or 8, 9, 10, 11 positions of the phenyl rings indicated. These substituents are selected from hydrogen, fluorine, chlorine, bromine, iodine, trifluoromethyl, and alkoxy, alkyl, and carbalkoxy, each having up to seven carbon atoms. The symbol E refers to an amino or substituted amino group attached at the 6-position.

Amino groups contemplated by the symbol E in Formula I include—NHOH, morpholino, thiamorpholino, piperidino, pyrrolidino, hexamethyleneimino, 4-(lower alkyl)piperazino, wherein the lower alkyl group contains up to four carbon atoms,

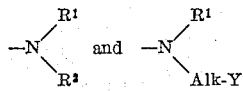

wherein $R^1$ is hydrogen, alkyl, or cycloalkyl each having up to seven carbon atoms, and $R^2$ is alkyl, carboxyalkyl, carbalkoxyalkyl, or cycloalkyl each having up to seven carbon atoms, hydrogen, phenyl, or thiazolyl. The symbol Alk is an alkylene group having up to three carbon atoms, and Y is an amino group selected from morpholino, thiamorpholino, piperidino, pyrrolidino, 4-(lower alkyl)piperazino, wherein the lower alkyl group contains up to four carbon atoms, and amino of the formula

wherein $R^1$ has the same meaning as above.

These substances and the salts thereof with pharmaceutically acceptable acids are biologically active and have pharmaceutical uses. Reference to salts of pharmaceutically acceptable acids is meant to refer to the salts of these compounds with acids such as hydrochloric acid, hydrobromic acid, hydroiodic acid, sulfuric acid, phosphoric acid, nitric acid, citric acid, succinic acid, gluconic acid, the alkyl, aryl, and aralkyl sulfonic and sulfuric acids having up to 20 carbon atoms such as methanesulfonic acid, p-toluenesulfonic acid, lauryl sulfuric acid, etc., the lower alkanoic acids such as acetic, propionic, and butyric acid, mucic acid, and the like, which are non-toxic and do not elicit undesired physiologic effects in their own right in the doses required for administration of the substances of Formula I.

The compounds and the salts thereof with pharmaceutically acceptable acids variously possess antifungal, antibacterial, anticonvulsant, muscle relaxant, interneuronal depressant, and a variety of psychotropic effects. The psychotropic effects elicited thereby on administration to animals are characterized as stimulant, aggressant, tranquilizing, and sedative. Their antifugal and antibacterial activity is manifested by the capacity of various members of the series to inhibit the growth of the following microorganisms in vitro:

Trichophyton mentagrophytes (gypseum) ATCC 9129
Trichophyton mentagrophytes (interdigitale) ATCC 9972
Microsporium audouini ATCC 9079
B. subtilis
K. pneumoniae
M. aureus
S. pyogenes
E. coli
Proteus morganii
S. typhomureum
S. fecalis The substances of Formula I and their pharmaceutically acceptable acid addition salts are exceedingly potent in their effect on the central nervous system when administered either orally or parenterally to animals in dosages of from 0.1 to 100 mg./kg. of body weight. Measurement of acute toxicities of these compounds in animals indicates that a wide margin of safety exists between the lethal dose and the effective dose thereof. The durations of action of the various specific substances of Formula I vary considerably, some being very short acting and other exhibiting prolonged effect.

Salts of the compounds of the present invention with pharmaceutically unacceptable acids are also contemplated as part of the present invention, since they are sometimes useful as chemical intermediates in the preparation of either the 6-aminodibenzodiazepines themselves or their pharmaceutically acceptable acid addition salts. Such acids include those which are not physiologically tolerable for seasons of toxicity, irritation, or sensitization, or because of pharmaceutical inelegance. In this category the following may be mentioned: perchloric acid, arsenous and arsenic acids, acids such as D-camphorsulfonic acid which may be useful in resolving optically active members of the class, and others which may be desirable for synthetic purposes when the salts thereof possess desirable chemical or physical properties, but which are physiologically intolerable.

Three related processes are employed for the preparation of the products of the present invention. Method A involves reaction of ammonia or an ammonium salt, hydroxylamine or a hydroxylamine acid addition salt, a primary amine or a secondary amine, or acid addition salts thereof with a 6-alkylthio or 6-benzylthio reactant of Formula II or an acid addition salt thereof. This process is represented by the following equation in which RSH refers to by-product mercaptan corresponding to the —SR group of Formula II.

METHOD A

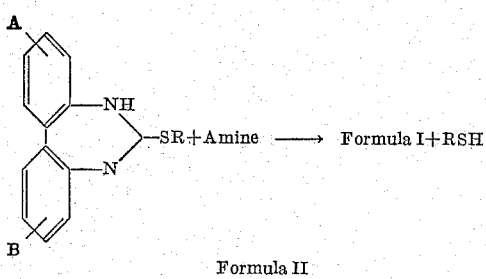

Formula II

The intermediates of Formula II are the subject of our copending application Serial No. 229,196, filed October 8, 1962. This application is a continuation-in-part of application Serial No. 229,195, which was filed therewith.

The symbol R in Formula II refers to the benzyl group or to a lower alkyl group having up to four carbon atoms. A and B have the same meanings as above. These intermediates are prepared from 6-mercapto-5H-dibenzo[d,f][1,3]diazepine or analogs thereof, having the appropriate substituents, A and B in the phenyl rings thereof by reaction with a lower alkyl chloride, bromide, or iodide. The preparation of 6-mercapto-5H-dibenzo[d,f][1,3]diazepine by reaction of carbon disulfide with 2,2'-diaminobiphenyl has been described in the literature (Le Fevre, J. Chem. Soc. 733 (1929)). The analogs thereof wherein A and B are other than hydrogen are prepared in a similar fashion.

Method B employs a 2,2'-diaminobiphenyl of the type used in the preparation of the intermediates of Formula II directly in the preparation of the compounds of Formula I. This method involves the reaction of a dialkyl carbodiimide or a dicycloalkylcarbodiimide with the appropriate 2,2'-diaminobiphenyl. In some instances this method is more convenient and offers operating advantages over that of Method A. It is represented by the following equation in which $R^3$ is an alkyl or cycloalkyl group having up to seven carbon atoms.

METHOD B

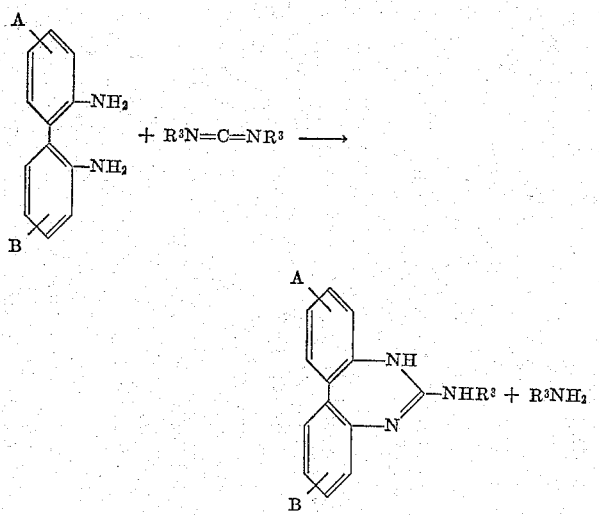

Method C is particularly adapted for the preparation of those compounds of Formula I in which E is an unsubstituted amino group. It involves the reaction of a diamino-biphenyl of the character referred to in Method B with an alkylisothiourea or benzylisothiourea salt, preferably one in which the alkyl group contains up to 4 carbon atoms. It is represented by the equation which follows, in which R has the same meaning as in Formula II and X refers to a halide or sulfate radical corresponding to that of the alkyl isothiourea starting material.

METHOD C

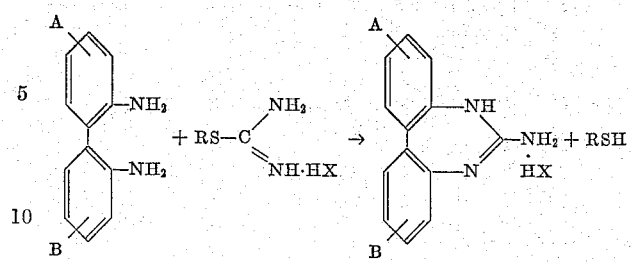

These processes are discussed in more detail in the following paragraphs and illustrations for the methods by means of specific examples are given.

METHOD A 6-methylthio-5H-dibenzo[d,f][1,3]diazepine or the hydrochloride or hydroiodide salt thereof is heated with the amine reactant at a temperature sufficient to effect liquification of the reaction mixture and result in evolution of methyl mercaptan which is evident by its odor. A temperature of about 70° C. has been found sufficient for the reaction to take place at an appreciable rate. The upper temperature limit is governed by the thermal stability of the products and reactants. A reaction temperature of 200° C. has been found convenient in a number of instances.

In some instances where a liquid amine serves as the amine reactant, an excess of the amine is employed as solvent, but ordinarily no solvent is used. In those instances where both reactants are solids, they are simply mixed and heated until reaction occurs.

It is preferred to employ an acid addition salt of either the diazepine or the amine reactant with a mineral acid or organic sulfonic acid such as hydrochloric, hydrobromic, hydroiodic, sulfuric, phosphoric, benzenesulfonic, or toluenesulfonic acid. Generally reaction occurs at a lower temperature when employing an acid addition salt as one of the reactants in the process than when reaction is effected between the free base forms of both amine and diazepine reactants.

Preparations 1, 2, and 3 below describe the preparation of 6-methylthio-5H-dibenzo[d,f][1,3]diazepine, its hydrochloride salt, and its hydroiodide salt which have proven to be convenient starting materials for this method. Examples 1, 2, and 3 illustrates the use of these three starting materials under various reaction conditions for the preparation of 6-amino-5H-dibenzo[d,f][1,3]diazepines of the present invention. Table I contains a summary of directions for the preparation of a number of additional compounds of the present invention. The physical properties of these and other compounds described herein are listed in Table III.

*Preparation 1: 6-methylthio-5H-dibenzo[d,f][1,3]diazepine hydroiodide.*—6-mercapto-5H-dibenzo[d,f][1,3]-diazepine (Le Fevre, J. Chem. Soc. 733 (1929)), 31.5 g. (0.14 mole), is dissolved in 260 ml. of tetrahydrofuran and stirred for 2 hours with 21 g. (0.15 mole) of methyl iodide. After the mixture has been allowed to stand overnight, the solid is collected and air dried to give 41 g. of white powder, M.P. 233–234° C. (dec.). This material is recrystallized from butanone-methanol, yielding the purified intermediate, M.P. 233–235° C. (dec.), which exhibits infra red absorption maxima (0.5%) in KBr) at 3.2, 3.3, 6.1, 6.3, 6.8, 7.0, and 13.1μ.

*Preparation 2: 6-methylthio-5H-dibenzo[d,f][1,3]di-azepine, free base form.*—A sample of the hydroiodide salt prepared from 45 g. of 2,2'-diaminobiphenyl as described in Preparation 1 is thoroughly mixed with 700 ml. of chloroform and 800 ml. of 5% potassium hydroxide solution. The chloroform layer is then separated and the solvent distilled therefrom. The residue obtained is twice recrystallized from a mixture of chloroform and heptane to yield the purified free base, M.P. 165–166° C. which exhibits absorption maxima in the infra red (0.5% in KBr) at 3.2, 6.1, 6.3, 6.7, 7.0, and 13.2μ, and in the ultra violet (0.01% in acetonitrile) λ max. 285, and 250 mμ; E max. 4600, and 42,700.

*Preparation 3: 6-methylthio-5H-dibenzo[d,f][1,3]diazepine hydrochloride.*—The free base form of the desired product, prepared as described in Preparation 2 is dissolved in 500 ml. of tetrahydrofuran and acidified with dry hydrogen chloride dissolved in ethanol. The slurry is allowed to stand overnight and the white precipitate collected on a filter. It is air dried, yielding the hydrochloride salt, M.P. 223–224° C. (dec.), which is employed as such without further purification in the preparation of various 6-amino-5H-dibenzo[d,f][1,3]diazepines of the present invention.

*Example 1.—6-diethylaminoethylmethylamino-5H-dibenzo[d,f][1,3]diazepine*

A mixture of 3 g. (0.0125 mole) of 6-methylthio-5H-dibenzo[d,f][1,3]diazepine (Preparation 2) and 2 g. (0.0154 mole) of N,N-diethyl-N'-methylethylenediamine is heated and the temperature permitted to rise to 200° C. About 3 hrs. elapses in the course of this heating step, and the odor of mercaptan nearly disappears at the end. The cooled mixture is thoroughly mixed with 30 ml. of water and the liquid decanted. The gum is washed with 50 ml. of methanol, and the solvent removed by distillation to remove mercaptan odor. The product is then converted to the dihydrochloride by treatment with 5 N HCl in ethanol, and twice recrystallized from ethanol-isopropyl ether, yielding 4 g. (81%) of purified product as fine white needles, M.P. 249–250° C. (dec.). The analytical results for this substance are listed in Table III.

*Example 2.—6-piperidino-5H-dibenzo[d,f][1,3]diazepine*

6-methylthio-5H-dibenzo[d,f][1,3]diazepine hydroiodide, 10 g. (0.027 mole, Preparation 1) is heated on a steam bath with 12 g. (0.14 mole) of piperidine for 8 hrs. The odor of methyl mercaptan becomes evident immediately upon mixing the reactants and persists throughout the heating period. Alkaline 50% ethanol is added to dissolve precipitated salts and then the mixture is diluted to 200 ml. with water. The precipitated product is collected and dried; yield, 6.5 g. (87%), colorless prisms, M.P. 142–143° C. Recrystallization from heptane yields the crystalline product as clusters of needles, M.P. 142–143° C. Its physical properties are listed in Table III.

*Example 3.—6-(2-morpholinoethyl)amino-5H-dibenzo-[d,f][1,3]diazepine dihydrochloride*

6-methylthio-5H-dibenzo[d,f][1,3]diazepine hydrochloride, 5.5 g. (0.02 mole, Preparation 3) is mixed with 10 g. of 4-(2-aminoethyl)morpholine and heated in an oil bath at 70–75° C. for 2 hrs. The amount of N-(2-aminoethyl)morpholine employed is in excess of the stoichiometric quantity and serves as solvent. Evolution of methyl mercaptan is evident when the internal temperature of the reaction mixture reaches 50–65° C. At the conclusion of the heating period the reaction mixture is cooled and mixed with 250 ml. of 5% aqueous isopropanol. It is chilled, the solvent decanted, and the residue dried by distilling 3 consecutive 20 ml. portions of absolute ethanol therefrom. The residue is then treated with an excess of 5 N ethanolic hydrogen chloride. The dihydrochloride salt of the desired product is then precipitated from the solution by treatment with diisopropyl ether. The slurry is chilled, the bulk of the solvent decanted, and the gummy precipitate recrystallized from a mixture of isopropanol and methanol, yielding 4.0 g. of gray crystalline solid, M.P. 279–280° C. (dec.). A second group of this product weighing 2.0 g. is obtained by concentration of the filtrates. These samples are combined and recrystallized from aqueous methanol, yield 5.5 g. of the purified product as colorless prisms, M.P. 279–280° C. (dec.). The physical properties of this material are listed in Table III.

METHOD B

This method is applicable to the preparation of these compounds of Formula I in which the group E is a secondary amino group, that is it is applicable to the preparation of 6-secondary amino-5H-dibenzo[d,f][1,3]diazepines. The method involves reaction of a 2,2'-diaminobiphenyl with an alkyl or cycloalkylcarbodiimide. Alkyl and cycloalkylcarbodiimide reactants are employed in which each of the alkyl or cycloalkyl groups contains from one to seven carbon atoms. The method involves heating 2,2'-diaminobiphenyl or a phenyl ring substituted derivative thereof with the carbodiimide reactant. The latter reactants have the formula $R^3N=C=NR^3$ in which $R^3$ refers to an alkyl or cycloalkyl group having up to 7 carbon atoms. The reactants are simply mixed and heated. In this process the by-product is a primary amine, the presence of which can ordinarily be detected by odor. The process is preferably conducted at a temperature in the range 160–200° C. Higher temperatures up to the decomposition temperature of either product or reactants may be employed, as may somewhat lower temperatures if longer reaction times are allowed. The product is recovered simply by allowing the reaction mixture to cool and then recrystallizing from an appropriate solvent. The following examples illustrate this method.

*Example 4.—6-isopropylamino-5H-dibenzo[d,f][1,3]diazepine*

2,2'-diaminobiphenyl, 9.2 g. (0.5 mole) is heated with 6.5 g. (0.05 mole) of N,N'-diisopropylcarbodiimide to 150° C., whereupon the odor of isopropylamine becomes evident at the mouth of the flask. The reaction proceeds briskly at 170° C. with a strong amine evolution. The temperature is held at 190° C.–200° C. for 30 minutes. The pale yellow melt is then allowed to cool and recrystallized once from ethanol-ethyl acetate and once from isopropanol to give 10 g. (80%) of colorless needles melting at 222.0–222.5° C. The physical properties of this substance are reported in Table III.

*Example 5.—6-cyclohexylamino-5H-dibenzo[d,f][1,3]diazepine*

The procedure of Example 4 is repeated, substituting N,N'-dicyclohexylcarbodiimide for the carbodiimide reactant specified in Example 4. The desired product is recovered in the fashion indicated in Example 4, and purified as described in that example. The properties of this substance are reported in Table III.

*Example 6.—6-isopropylamino-3,9-dimethyl-5H-dibenzo[d,f][1,3]diazepine*

The method of Example 4 is repeated, substituting as diaminobiphenyl starting material 2,2'-diamino-4,4'-dimethylbiphenyl, which is prepared by catalytic hydrogenation of 2,2'-dinitro-4,4'-dimethylbiphenyl (P. E. Fanta, Chem. Reviews 38, 139 (1946)) over 5% platinum-on-carbon catalyst. The product is recrystallized from isopropanol-acetone mixture, yielding the desired product, M.P. 239–240° C. The physical properties of this product are reported in Table III.

METHOD C

This method is restricted to the preparation of those 5H-dibenzo[d,f][1,3]diazepines having a primary amino group in the 6-position. It involves reacting 2,2'-diaminobiphenyl or an analog thereof bearing one or more phenyl ring-substituents with an S-lower alkyl or benzyl pseudothiourea salt. The halide and sulfate salts are most readily available and are quite satisfactory. Again from the standpoint of availability the S-methyl compounds are preferred, methyl pseudothiourea sulfate being employed as reactant in Example 7 which is generally illustrative of the method. The S-ethyl, S-propyl, and S-benzyl pseudothiourea salts are also operable.

As before, the process is carried out without solvent and by simply mixing the reactants and heating them at a temperature of from about 110° up to the decomposition temperature of either product or reactants, 200° C. having been found convenient. The lower alkyl mercaptan is evolved as a by-product and provides an easy gauge to the progress of the reaction, due to its strong odor. As the reaction mixture is heated, the odor of evolved mercaptan becomes apparent at about 110° C., indicating commencement of the reaction. A total heating period of about 1–3 hrs. is employed, allowing about 30 min. at 200° C.

*Example 7.—6-amino-5H-dibenzo[d,f][1,3]diazepine*

2,2'-diaminobiphenyl, 6 g. (0.033 mole) is heated with 6 g. of S-methylpseudothiourea sulfate to 100° C., whereupon methyl mercaptan evolved. The temperature is gradually raised to 200° C. and held there for 30 minutes. The mixture forms a gum which is cooled, collected, and triturated with excess alkaline (NaOH) 30% methanol. The mixture is then diluted with 200 ml. of water, leaving the product as an insoluble tan solid, which is collected. It is recrystallized from 35% ethanol, yielding the purified product as pale tan flakes weighing 2.5 g. (36%), M.P. 211° C. (dec.). The product appears to be subject to decomposition during the recrystallization step. The infra red spectrum and nitrogen analyses is listed in Table III.

For convenience in preparing compounds of this invention bearing phenyl ring-attached substituents, there are listed in Table II a number of substituted 2,2'-dinitrobiphenyls which have been described in the literature. Literature references for the preparation of these dinitrobiphenyls are listed by P. E. Fanta in Chem. Reviews 38, 139 (1946). These materials are transformed to corresponding 2,2'-diaminobiphenyls by catalytic hydrogenation of the nitro groups or by chemical reduction thereof.

Chemical reduction is preferred when functional groups are present in the molecule which are considered likely to interfere with or be adversely affected by catalytic hydrogenation. An applicable chemical reduction method is described by Hodgson and P. F. Holt in J. Chem. Soc. 37 (1937) for the preparation of 2,2'-diamino-4,4'-dimethoxybiphenyl from 2,2' - dinitro - 4,4' - dimethoxybiphenyl. The dinitro compound is refluxed in aqueous acetic acid with iron powder and the desired diamino compound is recovered by extraction with an organic solvent such as benzene and recovered by precipitation as the dihydrochloride salt.

The substituted-2,2'-diaminobiphenyls are transformed to correspondingly substituted 6-amino-5H-dibenzo[d,f]-[1,3]diazepines, according to Methods A, B, and C described above. Compounds of Formula I preparable from the diaminobiphenyls listed in Table II are also listed in that table.

*Examples 8 to 24*

Additional compounds prepared by Method A are shown in Table I in which is indicated the several amine reactants, the times and temperatures of reaction, the solvents employed for recrystallization, and the substituents in the 6 position of the several end products.

Other phenyl ring-substituted 2,2'-dinitrobiphenyls useful as starting materials for the preparation of compounds of the present invention may be prepared by replacement of phenyl ring attached amino groups of amino-substituted-2,2'-dinitrobiphenyls. This is accomplished by diazotization of the aromatic amino groups in the usual fashion followed by replacement of the diazonium groups as is known in the art, for instance according to the Sandmeyer or Schiemann methods. To illustrate, benzidine is readily converted to 2,2'-dinitrobenzidine by nitration according to the method described in Ber. 23, 794–798 (1890). The 2,2'-dinitrobenzidine is then tetrazotized as described by H. H. Hodgson, et al., J. Chem. Soc. 1620 (1937). On mixing the solution of the tetrazonium salt with a solution of cuprous iodide in hydroiodic acid, 2,2'-dinitro-4,4'-diiodobiphenyl is produced. This material is then reduced to the 2,2'-diamino compound and converted to a 6-amino-5H-dibenzo[d,f][1,3]diazepine as described herein.

TABLE I.—EXAMPLES 8–24

[Preparation of 6-amino-5H-dibenzo[d,f][1,3]diazepines]

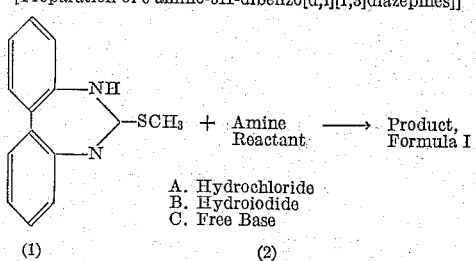

A. Hydrochloride
B. Hydroiodide
C. Free Base

| Example No. | Reactants (1) | Reactants (2) | Reaction temp., time | Recryst. Solvent | Product (Formula I, E=) |
|---|---|---|---|---|---|
| 8 | B | Hexamethyleneimine | 100° C., 8 hrs | Aqueous ethanol | —N⟨⟩ |
| 9 | B | 4-methylpiperazine | 100° C., 8 hrs | Methanol | —N⟨⟩N—CH₃·2HCl |
| 10 | C | (2-dimethylamino-ethyl) methylamine | 200° C., 3 hrs | Methanol-isopropyl ether | —N(CH₃)(CH₂CH₂N(CH₃)₂)·2 CHl |
| 11 | C | (2-diethylamino-ethyl)ethylamine | 200° C., 3 hrs | Ethanol-isopropanol | —N(C₂H₅)(CH₂CH₂N(C₂H₅)₂)·2HCl |
| 12 | C | Dimethylamine hydrochloride | 160–200° C., 30 min | 95% ethanol | —N(CH₃)₂·HCl |
| 13 | C | Diethylamine hydrochloride.¹ | 160° C., 24 hrs | Methanol | —N(C₂H₅)₂·HCl |
| 14 | C | Methylamine hydrochloride | 170–200° C., 30 mins | Heptane | —NHCH₃ |

TABLE I.—EXAMPLES 8-24—Continued

| Example No. | Reactants (1) | Reactants (2) | Reaction temp., time | Recryst. Solvent | Product (Formula I, E=) |
|---|---|---|---|---|---|
| 15 | C | Ethylamine hydrochloride | 170–200° C., 30 mins | 95% ethanol | —NHC$_2$H$_5$ |
| 16 | A | Morpholine hydrochloride | 100° C., 4 hrs | Methanol-isopropyl ether | —N⟨⟩O·HCl |
| 17 | A | Pyrrolidine | 100° C., 4 hrs | Dimethyl-formamide-water | —N⟨⟩·HCl |
| 18 | A | 2-aminothiazole | 100° C., 10 mins | Dimethyl-formamide-water | HN-⟨S⟩—N |
| 19 | C | n-Butylamine hydrochloride | 200° C., 30 mins | Methanol-diisopropyl ether | —NH(CH$_2$)$_3$CH$_3$·HCl |
| 20 | A | Aniline | 180–185° C., 2 hrs | Methoxy-ethanol-water | —NH—⟨⟩ |
| 21 | A | Thiamorpholine hydrochloride | 100° C., 8 hrs | | —N⟨⟩S·HCl |
| 22 | A | 2-diethylamino-ethylamine | 75–80° C., 3 hrs | 95% ethanol ethyl acetate | —NHCH$_2$CH$_2$N(C$_2$H$_5$)$_2$·2 HCl |
| 23 | A | 2-dimethylamino-ethylamine | 70–125° C., 3 hrs | 95% ethanol-ethyl acetate | —NHCH$_2$CH$_2$N(CH$_3$)$_2$·2 HCl |
| 24 | (²) | 2-morpholinoethylamine | 70–125° C., 4 hrs | 95% ethanol | —NHCH$_2$CH$_2$N⟨⟩O |

¹ Excess diethylamine serves as reaction medium.
² 3,9-Dichloro-6-methylthio[d,f][1,3]diazepine hydrochloride used as starting material.

TABLE II.—PHENYL RING-SUBSTITUTED PRODUCTS OF FORMULA I

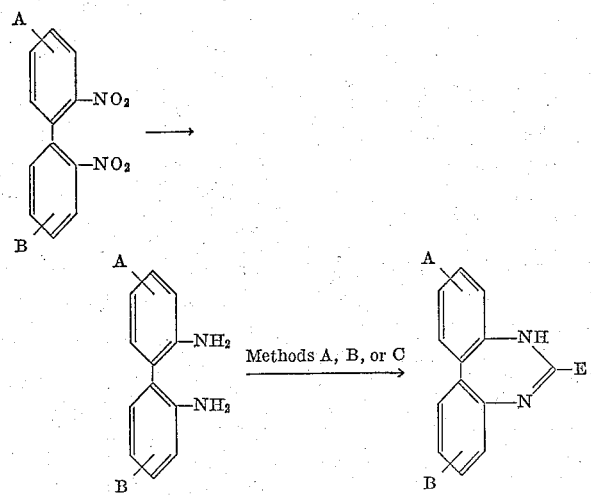

| Substituted-2,2'-Dinitrobiphenyl A | Substituted-2,2'-Dinitrobiphenyl B | Substituted-6-amino-5H-dibenzo[d,f][1,3]diazepine Substituents |
|---|---|---|
| 4-fluoro | 4'-fluoro | 3,9-difluoro. |
| 4-chloro | 4'-chloro | 3,9-dichloro. |
| 3,6-dichloro | 3',6'-dichloro | 1,4,8,11-tetrachloro. |
| 4-bromo | 4'-bromo | 3,9-dibromo. |
| 3-methyl | 3'-methyl | 4,8-dimethyl. |
| 6-methyl | 6'-methyl | 1,11-dimethyl. |
| 4-methyl | 4'-methyl | 3,9-dimethyl. |
| 4-methyl-6-chloro | 4'-methyl-6'-chloro | 1,11-dichloro-3,9-dimethyl. |
| 4-methyl-6-bromo | 4'-methyl-6'-bromo | 1,11-dibromo-3,9-dimethyl. |
| 4,6-dimethyl | 4',6'-dimethyl | 1,3,9,11-tetramethyl. |
| 6-methoxy | 6'-methoxy | 1,11-dimethoxy. |
| 4-methoxy | 4'-methoxy | 3,9-dimethoxy. |
| 4-ethoxy | 4'-ethoxy | 3,9-diethoxy. |
| 4,5-dimethoxy | 4',5'-dimethoxy | 2,3,9,10-tetramethoxy. |
| 6-carbethoxy | 6'-carbomethoxy | 1,11-dicarbomethoxy. |
| 6-carbethoxy | 6'-carbethoxy | 1,11-dicarbethoxy. |
| 3-carbethoxy | 3'-carbethoxy | 4,8-dicarbethoxy. |
| 4-carbomethoxy | 4'-carbomethoxy | 3,9-dicarbethoxy. |
| 6-carbomethoxy | Hydrogen | 1-carbomethoxy. |
| 4-trifluoromethyl | 4'-trifluoromethyl¹ | 3,9-bis(trifluoromethyl) |

¹ Prepared by the Ullmann condensation of 2-nitro-4-trifluoromethyl-chlorobenzene according to the general method described by P. E. Fanta, oc. cit.

*Example 25.—(a) 6-carboxymethylamino-5H-dibenzo-[d,f][1,3]diazepine*

6-methylthio - 5H - dibenzo[d,f][1,3]diazepine hydrochloride, 5.5 g. (0.02 mole), is mixed with a solution of 1.5 g. (0.02 mole) of glycine and 0.8 g. (0.02 mole) of sodium hydroxide in 30 ml. of water and 20 ml. of dioxane, and the mixture is warmed on the steam bath at 40–50° C. for 20 hrs. The solution is then allowed to cool to room temperature to permit crystallization of the product. The product separates as a white precipitate and is recovered by filtration and dried in the air. It is then recrystallized from acetone, yielding the desired material, M.P. 289–290° C.

*(b) 6-carbethoxymethylamino-5H-dibenzo[d,f][1,3]-diazepine hydrochloride*

The product of part *a* preceding, 3 g., is dissolved in 30 ml. of 5 N-ethanolic hydrogen chloride and the solution is evaporated to dryness by boiling in an open beaker. The residue is recrystallized from a mixture of ethyl acetate and ethanol, yielding the desired product weighing 1.5 g., M.P. 190–191° C. (dec.). The physical constants of this substance are reported in Table III.

*Example 26.—6-hydroxylamino-5H-dibenzo[d,f][1,3]-diazepine hydrochloride*

A mixture of 4.2 g. (0.06 mole) of hydroxylamine hydrochloride, 8.3 g. (0.03 mole) of 6-methylthio-5H-dibenzo[d,f][1,3]diazepine hydrochloride, 50 ml. of dioxane, and 3.6 g. of sodium hydroxide dissolved in 50 ml. of water is prepared. The odor of methylmercaptan is immediately apparent on mixing. The mixture is stirred at room temperature (30° C.) for 18 hrs., diluted to 200 ml. with water, and the white precipitate collected. The white precipitate makes its first appearance after about 2 hrs. of stirring at room temperature. It is dried in the air, yielding a pure white powder, M.P. 169–170° C. (dec.). This product is twice recrystallized from 95% ethanol, yielding 7.5 g. (95%) of the desired product in purified form as colorless needles, M.P. 225–226° C. (dec.). The physical constants for this substance are listed in Table III.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

TABLE III.—PHYSICAL PROPERTIES 6-SUBSTITUTED-5H-DIBENZO [d,f] [1,3] DIAZEPINES

| Example No. | 6-Substituent | Salt | Formula | Analysis (Percent by wt.) | Ultra Violet Absorption [1] (mµ) $\lambda$ max./E max. | | Infra Red Absorption [2] $\lambda$ max. ($\mu$) | Melting Point (°C.) |
|---|---|---|---|---|---|---|---|---|
| 1 | (2-diethylamino-ethyl) methylamino. | Dihydrochloride | $C_{20}H_{28}Cl_2N_4$ | N, 13.91; Cl, 17.76 | | | 3.4, 5.1, 6.4, 6.7, 7.0, 13.0. | 246–247 (dec.) |
| 2 | Piperidino | Free base | $C_{18}H_{19}N_3$ | C, 77.76, H, 7.13, N, 15.03 | 280 243 | 4,850 43,100 | 3.0, 3.4, 3.5, 6.1, 6.3, 6.8, 7.0, 13.1, 13.7. | 144–145 |
| 3 | (2-morpholinoethyl) amino. | Dihydrochloride | $C_{19}H_{24}N_4OCl_2$ | N, 13.90, Cl, 17.65 | 280 237 220 | 3,160 48,800 32,600 | 3.1, 3.4, 6.0, 6.3, 6.8, 7.0, 13.1, 13.7. | 277–278 (dec.) |
| 4 | Isopropylamino | Free base | $C_{16}H_{17}N_3$ | C, 76.38, H, 6.87, N, 16.65 | 275 241 | 4,540 43,100 | 3.0, 3.3, 6.1, 6.3, 6.7, 6.9, 13.1. | 228–22p |
| 5 | Cyclohexylamino | do | $C_{19}H_{21}N_3$ | C, 78.00, H, 7.37, N, 14.64 | 275 240 216 | 3,880 38,300 30,000 | 3.0, 3.4, 3.5, 6.0, 6.3, 6.7, 6.8, 7.0, 13.1. | 231–232 |
| 6 | ([3]) | do | $C_{18}H_{21}N_3$ | N, 14.80 | 280 243 220 | 4,300 40,000 33,000 | 3.0, 3.5, 6.1, 6.3, 6.6, 6.8, 12.5. | 244.5–246 |
| 7 | Amino | do | $C_{13}H_{11}N_3$ | N, 19.90 | 278 240 | 3,080 34,900 | 3.0, 3.3, 6.0, 6.3, 6.8, 7.0, 13.1. | 208–209 (dec.) |
| 8 | Hexamethyleneimino | Ethanol complex | $C_{21}H_{27}N_3O$ | C, 74.97, H, 8.11, N, 12.53 | 280 241 217 | 4,820 41,800 30,700 | 3.0, 3.4, 6.1, 6.3, 6.8, 7.0, 13.1, 13.7. | 69–80 (dec.) |
| 9 | 4-methylpiperazino | Dihydrochloride | $C_{18}H_{22}Cl_2N_4$ | N, 15.11, Cl, 19.39 | 270 239 220 | 3,650 53,300 27,800 | 3.4, 3.7, 6.1, 6.5, 7.0, 13.0. | >310 |
| 10 | (2-dimethylaminoethyl) methylamino. | do | $C_{18}H_{24}Cl_2N_4$ | N, 14.92, Cl, 19.39 | 280 240 220 | 3,300 49,000 26,600 | 3.4, 5.1, 6.4, 6.7, 7.0, 13.0. | 250–251 |
| 11 | (2-diethylaminoethyl) ethylamino. | do | $C_{21}H_{30}Cl_2N_4$ | N, 13.41, Cl, 17.11 | 280 240 220 | 3,300 43,000 25,900 | 3.4, 6.1, 6.4, 6.7, 7.0, 13.0. | 159–161 |
| 12 | Dimethylamino | Hydrochloride | $C_{15}H_{16}ClN_3$ | C, 65.97, H, 6.13, N, 15.06 | 280 238 219 | 3,070 46,400 37,000 | 3.3, 3.4, 3.5, 6.0, 6.3, 6.7, 7.0, 13.0. | >310 |
| 13 | Diethylamino | do | $C_{17}H_{20}ClN_3$ | N, 13.70, Cl, 11.87 | 280 238 217 | 3,470 51,100 30,900 | 3.4, 6.1, 6.4, 6.6, 6.7, 7.0, 13.1. | >310 |
| 14 | Methylamino | Free base | $C_{14}H_{13}N_3$ | C, 75.31, H, 6.19, N, 18.77 | 280 241 216 | 3,800 38,800 31,400 | 3.0, 3.3, 6.0, 6.3, 6.8, 7.0, 13.0. | 243–245 |
| 15 | Ethylamino | do | $C_{15}H_{15}N_3$ | C, 75.92, H, 6.66, N, 17.56 | 280 241 216 | 3,910 40,000 32,000 | 3.0, 3.3, 6.0, 6.3, 6.8, 7.0, 13.0. | 213–215 |
| 16 | Morpholino | Hydrochloride | $C_{17}H_{18}N_3OCl$ | C, 64.89, H, 5.96, N, 13.37, Cl, 11.29 | 275 240 219 | 3,750 57,000 28,200 | 3.3, 3.5, 6.1, 6.4, 6.6, 6.7, 7.0, 13.1. | >310 |
| 17 | Pyrrolidino | do | $C_{17}H_{18}N_3Cl$ | N, 13.79, Cl, 11.67 | 280 239 219 | 3,600 53,400 31,600 | 3.2, 3.3, 3.4, 6.1, 6.3, 6.5, 6.7, 7.0, 13.0. | >310 |
| 18 | 2-thiazolylamino | Free base | $C_{16}H_{12}N_4S$ | N, 19.17 S, 10.97 | 312 235 | 26,900 29,200 | 3.3, 3.4, 6.0, 6.4, 6.8, 7.0, 13.2. | 204–205 |
| 19 | n-Butylamino | Hydrochloride | $C_{17}H_{20}N_3Cl$ | N, 13.74, Cl, 11.96 | 280 237 220 | 3,290 51,000 34,700 | 3.1, 3.2, 3.3, 3.4, 6.0, 6.3, 6.66, 6.7, 7.0, 13.1. | 239–241 |
| 20 | Anilino | Free base | $C_{19}H_{15}N_3$ | C, 80.05, H, 5.60, N, 14.93, | 232 | 33,800 | 3.0, 3.3, 3.5, 6.0, 6.4, 6.7, 7.2, 13.1. | 255–256 |
| 22 | 2-diethylaminoethyl-amino. | Dihydrochloride | $C_{13}H_{26}N_4Cl_2$ | C, 59.18, H, 7.24, N, 14.41, Cl, 18.46 | | | 3.4, 6.0, 6.7, 7.0, 13.1. | 222.5–222 |
| 23 | 2-dimethylaminoethyl-amino. | do | $C_{17}H_{22}N_4Cl_2$ | C, 57.80, H, 6.58, N, 15.79, Cl, 20.16 | | | 3.4, 6.0, 6.7, 7.0, 13.1. | 219–221 |
| 24 | ([4]) | Free base | $C_{19}H_{20}N_4Cl_2$ | C, 58.18, H, 5.40, N, 14.17, Cl, 18.16 | | | 3.4, 6.0, 6.3, 6.8, 12.4. | 215.5–217.5 |
| 25 | Carbethoxymethylamino | Hydrochloride | $C_{17}H_{18}N_3O_2Cl$ | N, 12.70, Cl, 10.60, | 270 235 | 3,300 48,100 | 3.3, 5.7, 6.0, 6.3, 6.7, 7.0, 8.2, 13.1. | 193–194 (dec.) |

See footnotes at end of table.

TABLE III.—PHYSICAL PROPERTIES 6-SUBSTITUTED-5H-DIBENZO [d,f] [1,3] DIAZEPINES—Continued

| Example No. | 6-Substituent | Salt | Formula | Analysis (Percent by wt.) | Ultra Violet Absorption [1] ($m\mu$) $\lambda$ max./E max. | | Infra Red Absorption [2] $\lambda$ max. ($\mu$) | Melting Point (° C.) |
|---|---|---|---|---|---|---|---|---|
| 26 | Hydroxylamino | Hydrochloride | $C_{13}H_{12}N_3ClO$ | C, 59.57, H, 4.93, N, 16.00, Cl, 13.79 | 295 235 | 3,430 38,200 | 3.3, 6.0, 6.4, 6.7, 7.0, 13.1. | 225–226 (dec.) |

[1] At a concentration of 0.01 mg./ml. in 95% ethanol.
[2] At a concentration of 0.5% in crystalline KBr.
[3] 6-isopropylamino-3,9-dimethyl-5H-dibenzo[d,f][1,3]diazepine.
[4] 6-(2-morpholinoethylamino)-3,9-dichloro-5H-dibenzo[d,f][1,3]diazepine.

What is claimed is:

1. A compound selected from the group consisting of a compound of the formula

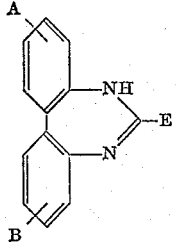

and the acid addition salts hereof, wherein A and B each represent up to two phenyl ring-attached substituents selected from the group consisting of hydrogen, fluorine, chlorine, bromine, iodine, trifluoromethyl, and alkoxy, alkyl, and carbalkoxy each having up to seven carbon atoms, and wherein E is an amino group selected from the group consisting of hydroxylamino, morpholino, thiamorpholino, piperidino, pyrrolidino, hexamethyleneimino, 4-(lower alkyl)piperazino in which the lower alkyl group has up to four carbon atoms,

and

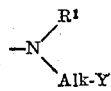

wherein $R^1$ is selected from the group consisting of hydrogen, alkyl, and cycloalkyl each having up to seven carbon atoms, $R^2$ is selected from the group consisting of alkyl, carboxyalkyl, carbalkoxyalkyl, cycloalkyl each having up to seven carbon atoms, hydrogen, phenyl, and thiazolyl, Alk is an alkylene group having up to 3 carbon atoms, and Y is an amino group selected from the group consisting of morpholino, thiomorpholino, piperidino, pyrrolidino, 4-(lower alkyl)-piperazino, in which the lower alkyl group has up to four carbon atoms, and amino of the formula

wherein $R^1$ has the same meaning as above.

2. The compound of claim 1 wherein A and B are hydrogen and E is alkylamino.
3. The compound of claim 1 wherein A and B are hydrogen and E is dialkylamino.
4. 6-isopropylamino-5H-dibenzo[d,f][1,3]diazepine.
5. 6-piperidino-5H-dibenzo[d,f][1,3]diazepine.
6. 6-hexamethyleneimino - 5H - dibenzo[d,f][1,3]-diazepine.
7. 6-diethylamino-5H-dibenzo[d,f][1,3]diazepine.
8. 6-pyrrolidino-5H-dibenzo[d,f][1,3]diazepine.
9. The process which comprises heating a 2,2'-diaminodiphenyl reactant of the formula

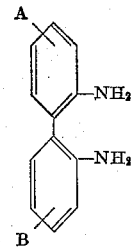

wherein A and B are each up to two phenyl ring-attached substituents selected from the group consisting of hydrogen, fluorine, chlorine, bromine, iodine, alkoxy, alkyl, carbalkoxy, each having up to seven carbon atoms, with a carbodiimide reactant of the formula $R^3N=C=NR^3$, wherein $R^3$ is selected from the group consisting of alkyl and cycloalkyl having up to 7 carbon atoms at a temperature of at least about 110° C., thereby effecting condensation of said 2,2'-diaminodiphenyl and carbodiimide reactants to produce a compound of the formula

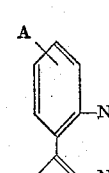

wherein A, B, and $R^3$ have the same meaning as above.

10. The process which comprises heating a compound selected from the group consisting of the S-benzylpseudothiourea sulfates and halides, and S-lower alkylpseudothiourea sulfates and halides having up to 4 carbon atoms in said lower alkyl group with a 2,2'-diaminodiphenyl reactant of the formula

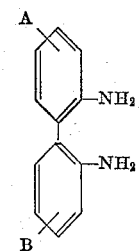

wherein A and B each represent up to two phenyl ring-attached substituents selected from the group consisting of hydrogen, fluorine, chlorine, bromine, iodine, alkoxy, alkyl, and carbalkoxy having up to seven carbon atoms, at a temperature of at least about 110° C. thereby producing a compound of the formula
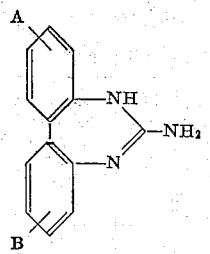
wherein A and B have the same meaning as above.
11. The process of claim 10 wherein methyl pseudo-thiourea sulfate is employed.
References Cited in the file of this patent
UNITED STATES PATENTS
3,098,075    Druey et al. _____ July 16, 1963